United States Patent Office 3,282,963
Patented Nov. 1, 1966

3,282,963
PREPARATION OF 2,2,4,4-TETRAALKYL-3-HYDROXY-3-BUTENOIC ACID BETA-LACTONES
Ronald G. Nations, Kingsport, Tenn., assignor to Eastman Kodak Company, Rochester, N.Y., a corporation of New Jersey
No Drawing. Filed Apr. 12, 1965, Ser. No. 447,539
9 Claims. (Cl. 260—343.9)

This invention relates to processes of preparing beta-lactone dimers of dialkylketenes. More particularly, this invention is concerned with a method of producing 2,2,4,4-tetra-substituted-3-hydroxy-3-butenoic acid beta-lactones by catalytic rearrangement of tetra-substituted-1,3-cyclobutanediones.

The compounds produced by the method of the invention are unsaturated beta-lactones of the formula:

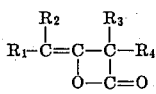

wherein $R_1$, $R_2$, $R_3$ and $R_4$ are lower alkyl groups having generally from 1 to 4 carbon atoms and in which the pair of substituents $R_1$ and $R_2$, and the pair of substituents $R_3$ and $R_4$, can also be lower alkylene groups which, with the carbon atom to which each pair is attached, form a 5 to 7 member saturated carbocyclic ring. The rings can also have hydrocarbon residues such as one or more methyl or ethyl groups. These compounds, and methods of producing the same, have been previously disclosed, as see R. D. Clark, U.S. Patent 3,062,837, issued November 6, 1962.

The Clark U.S. Patent 3,062,837 discloses that 2,2,4,4-tetra-substituted 1,3-cyclobutanediones can be rearranged in the presence of a Lewis acid catalyst, such as aluminum chloride, to form the 2,2,4,4-tetra-substituted-3-hydroxy-3-butenoic acid beta-lactones. While this method is satisfactory, the provision of an alternative method of preparing the compounds gives flexibility in selecting the route most suitable for prevailing conditions and availability of materials.

According to the present invention it has been found that by contacting a 2,2,4,4-tetra-substituted 1,3-cyclobutanedione with a metal cyanide, with such heat as is necessary, there is produced a 2,2,4,4-tetra-substituted-3-hydroxy-3-butenoic acid beta-lactone. This process can be represented as follows:

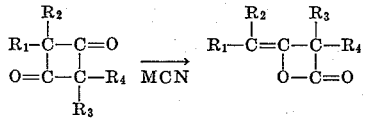

wherein $R_1$, $R_2$, $R_3$ and $R_4$ have the significance previously assigned and M represents a metal atom.

For convenience, the term "tetraalkyl-1,3-cyclobutanedione" is used at times herein to cover all the tetra-substituted 1,3-cyclobutanedione starting materials. Likewise, the designation of the product as a tetraalkyl-substituted lactone is intended to include the indicated alkylene-substituted ring compounds.

The tetraalkyl-1,3-cyclobutanediones used in the method of the invention are readily prepared by dimerization of dialkyl ketenes. See "Organic Reactions," John Wiley and Sons, New York, 1946, Vol. 3, Chapter 3, W. E. Hanford and J. G. Sauer, "Preparation of Ketenes and Ketene Dimers."

Some of the starting materials which can be used in the process of this invention are tetramethyl-1,3-cyclobutanedione,
dimethyldiethyl-1,3-cyclobutanedione,
tetraethyl-1,3-cyclobutanedione,
tetra-n-propyl-1,3-cyclobutanedione,
6,12-dioxodispiro[4.1.4.1]dodecane and
dioxodispiro[5.1.5.1]tetradecane.

The reaction can be carried out in the presence, or absence, of a liquid reaction medium. The use of a solvent facilitates contact between the catalyst and the starting material and aids in temperature control. The solvent should be inert or at least should not react rapidly with the starting materials, the catalyst, or the product. Some solvents that can be used are (a) hydrocarbons such as nonanes and higher homologs, (b) ethers such as ethylene glycol dimethyl ether and (c) higher ketones such as diisoamyl ketone. Unsuitable solvents are hydroxy compounds such as alcohols, water and carboxylic acids; amines; mercaptans; and other solvents that react with ketene dimers.

The metal cyanides which can be used in the process are quite extensive and include the stable cyanides of silver, copper, mercury, calcium, cadmium barium, cesium, indium, lead, rhenium, cobalt, platinum and nickel. The catalysts considered most suitable are the alkali metal cyanides and particularly sodium cyanide, potassium cyanide and lithium cyanide.

The amount of catalyst used is not narrowly critical. However, on a batch basis a molar ratio of catalyst to tetraalkyl-1,3-cyclobutanedione in the range of 0.001 to 0.1 or higher is often suitable. Larger amounts of catalyst are not detrimental to the process and can be beneficially used at times for a continuous operation.

The catalyst can be added to the tetraalkyl-1,3-cyclobutanedione or the tetraalkyl-1,3-cyclobutanedione can be added to the catalyst. In a batch operation it is generally more convenient to add the catalyst to the tetraalkyl-1,3-cyclobutanedione. In a continuous process it is convenient to pump the reactant over and through the catalyst to form the product.

Mixing of the catalyst with the tetraalkyl-1,3-cyclobutanedione is conducted as needed to bring the catalyst into contact with the reactant.

The catalytic reaction can be effected at temperatures in the range of 110–250° C.; however, the lower temperatures within this range require rather long reaction times while the higher temperatures may cause some decomposition of the reactants and product. The temperature range of about 150° to 180° C. generally is used most satisfactorily. At temperatures around 180° C., substantially complete reaction is obtained in a few minutes. At temperatures around 130° C., the process may take a day or more for substantially complete reaction.

After the reaction has been terminated, the desired product can be separated from the reaction mixture by conventional means, such as distillation.

Among the compounds which are produced as described, using the appropriate starting materials, are:

2,2,4-trimethyl-3-hydroxy-3-pentenoic acid beta-lactone,
2,4-dimethyl-2-ethyl-3-hydroxy-3-hexenoic acid beta-lactone,
2-methyl-2,4-diethyl-3-hydroxy-3-hexenoic acid beta-lactone,
2,2-diethyl-4-methyl-3-hydroxy-3-pentenoic acid beta-lactone,
2,2,4-triethyl-3-hydroxy-3-hexenoic acid beta-lactone, and
3-oxo-1-cyclohexylidene-2-oxaspiro[3.5]nonane.

The following examples are presented to further illustrate the invention.

*Example 1*

To 140 g. of tetramethyl-1,3-cyclobutanedione is added 2 g. of potassium cyanide. After the mixture is heated to reflux for 2 hours it is distilled to give 115 g. (82% yield) of 2,2,4-trimethyl-3-hydroxy-3-pentenoic acid beta-lactone, B.P. 167–169° C., $n_D^{20}$ 1.4390.

Example 2

Tetramethyl-1,3-cyclobutanedione is passed at 170° C. through granular potassium cyanide packed into a tubular column that is 1 inch inside diameter and 24 inches long. The feed rate is between 200 and 400 g. per hour. The effluent is substantially pure 2,2,4-trimethyl-3-hydroxy-3-pentenoic acid beta-lactone.

Example 3

2,4-diethyl-2,4-dimethyl-1,3-cyclobutanedione is converted by the procedure of Example 1 to 2-ethyl-2,4-dimethyl-3-hydroxy-3-hexenoic acid beta-lactone, B.P. 82–83° C. (10 mm.) $n_D^{20}$ 1.4450.

Example 4

Tetraethyl-1,3-cyclobutanedione is converted by the procedure of Example 2 to 2,2,4-triethyl-3-hydroxy-3-hexenoic acid beta-lactone, B.P. 121–123° C. (24 mm.).

Example 5

Tetramethyl-1,3-cyclobutanedione is converted to 2,2,4-trimethyl-3-hydroxy-3-pentenoic acid beta-lactone by the use of 1% by weight of sodium cyanide and a temperature of 180° C. This procedure gives 2,2,4-trimethyl-3-hydroxy-3-pentenoic acid beta-lactone in above 90% yield.

Example 6

By reacting tetramethyl-1,3-cyclobutanedione with 1% by weight of lithium cyanide at a temperature of 180° C. there is obtained 2,2,4-trimethyl-3-hydroxy-3-pentenoic acid beta-lactone.

Although the invention has been described in considerable detail with particular reference to certain preferred embodiments thereof, variations and modifications can be effected within the spirit and scope of the invention as described hereinbefore and as defined in the appended claims.

What is claimed is:

1. The process which comprises contacting a tetraalkyl-1,3-cyclobutanedione of the formula

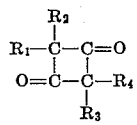

with a metal cyanide catalyst selected from the group consisting of alkali metal cyanides, and the stable cyanides of silver, copper, mercury, calcium, cadmium barium, cesium, indium, lead, rhenium, cobalt, platinum, and nickel, to produce a beta-lactone of the formula

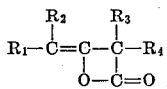

wherein $R_1$, $R_2$, $R_3$ and $R_4$ are members selected from the group consisting of lower alkyl groups having 1 to 4 carbon atoms and the pair $R_1$ and $R_2$, and the pair $R_3$ and $R_4$, are lower alkylene groups which, with the carbon atom to which each is attached, form a saturated carbocyclic ring having 5 to 7 carbon atoms in the ring.

2. The process which comprises contacting a tetraalkyl-1,3-cyclobutanedione in which the alkyl groups have from 1 to 4 carbon atoms with a metal cyanide catalyst selected from the group consisting of alkali metal cyanides, and the stable cyanides of silver, copper, mercury, calcium, cadmium, barium, cesium, indium, lead, rhenium, cobalt, platinum, and nickel, at a temperature of about 110 to 250° C. to produce a 2,2,4,4-tetraalkyl-3-hydroxy-3-butenoic acid beta-lactone.

3. The process of claim 2 in which about 0.001 to 0.1 molar ratio of metal cyanide to dione is used.

4. The process of claim 1 in which the metal cyanide is an alkali metal cyanide.

5. The process which comprises contacting a tetraalkyl-1,3-cyclobutanedione in which the alkyl groups have from 1 to 4 carbon atoms with an alkali metal cyanide at a temperature of about 110 to 250° C. to produce a 2,2,4,4-tetraalkyl-3-hydroxy-3-butenoic acid beta-lactone.

6. The process of claim 5 in which a temperature of about 150° to 180° is used.

7. The process which comprises contacting tetramethyl-1,3-cyclobutanedione with an alkali metal cyanide at a temperature of about 110° to 250° C. to produce 2,2,4-trimethyl-3-hydroxy-3-pentenoic acid beta-lactone.

8. The process which comprises contacting 2,4-diethyl-2,4-dimethyl-1,3-cyclobutanedione with an alkali metal cyanide at a temperature of about 110° to 250° C. to produce 2-ethyl-2,4-dimethyl-3-hydroxy-3-hexenoic acid beta-lactone.

9. The process which comprises contacting tetraethyl-1,3-cyclobutanedione with an alkali metal cyanide at a temperature of about 110° to 250° C. to produce 2,2,4-triethyl-3-hydroxy-3-hexenoic acid beta-lactone.

No references cited.

ALEX MAZEL, *Primary Examiner.*

JOSEPH A. NARCAVAGE, *Assistant Examiner.*